(12) United States Patent
Dreher

(10) Patent No.: US 8,322,683 B2
(45) Date of Patent: *Dec. 4, 2012

(54) METHOD AND DEVICE FOR AN ACTUATOR MOTOR INCLUDING A FAN BRAKE DEVICE

(75) Inventor: Lincoln J. Dreher, Patoka, IN (US)

(73) Assignee: Hansen Corporation, Princeton, IN (US)

( * ) Notice: Subject to any disclaimer, the term of this patent is extended or adjusted under 35 U.S.C. 154(b) by 437 days.

This patent is subject to a terminal disclaimer.

(21) Appl. No.: 11/484,787

(22) Filed: Jul. 10, 2006

(65) Prior Publication Data
US 2008/0009236 A1 Jan. 10, 2008

(51) Int. Cl.
*F16K 31/02* (2006.01)
(52) U.S. Cl. .......... 251/129.13; 310/77; 310/93
(58) Field of Classification Search .......... 251/48, 251/129.1, 129.13, 336, 129.11, 12, 64; 454/256, 454/259; 310/77, 93; 477/21
See application file for complete search history.

(56) References Cited

U.S. PATENT DOCUMENTS

| | | | |
|---|---|---|---|
| 3,562,565 A * | 2/1971 | Higashino et al. | 310/77 |
| 6,565,334 B1 | 5/2003 | Bradbury et al. | |
| 6,622,984 B2 * | 9/2003 | Rauch et al. | 251/71 |
| 6,781,264 B1 * | 8/2004 | Conrad et al. | 310/77 |
| 2005/0205819 A1 | 9/2005 | Morrison | |

FOREIGN PATENT DOCUMENTS

| | | |
|---|---|---|
| EP | 313290 A1 * | 4/1989 |
| KR | 20-0247590 | 10/2001 |
| KR | 10-0463705 | 12/2004 |
| WO | WO 2005/090842 A1 | 9/2005 |

* cited by examiner

*Primary Examiner* — Craig Schneider
*Assistant Examiner* — Andrew J Rost
(74) *Attorney, Agent, or Firm* — Fountainhead Law Group P.C.

(57) ABSTRACT

A damper actuator motor device includes a fan brake device which is secured to a motor rotor shaft and is configured to reduce motor rotation speed in a preferential direction. Preferably, the fan brake device has an asymmetric configuration, and is adapted to gather air radially in an enclosed cavity and discharge it axially in one direction. The fan device preferably is adapted to project a size that takes up more than half of the space of the cavity. When the motor is back driven, the fan brake device causes differentially pressure and air resistance in a confined area, producing a drag and braking force that increases with motor speed. The invention can be applied to motor actuators used to control air dampers and other valves in gas or fluid delivery systems. The invention can also be used to reduce water hammer in water delivery systems.

25 Claims, 7 Drawing Sheets

METHOD AND DEVICE FOR AN ACTUATOR MOTOR INCLUDING A FAN BRAKE DEVICE

BACKGROUND OF THE INVENTION

The present invention is directed generally to air and fluid delivery systems. More particularly, the present invention provides a method and device for an improved motor actuator for controlling dampers or valves used in air or fluid delivery systems. Merely by way of example, the present invention provides techniques for an air duct damper actuator motor including a fan brake configured to produce a braking force when the motor actuator is back driven. But it would be recognized that the invention has a much broader range of applicability. For example the invention can be applied to motor actuators used to control valves in various gas or fluid delivery systems. The invention can also be used to reduce water hammer in water delivery system.

In an HVAC (Heating, Ventilation and Air-Conditioning) system, sometimes referred to as climate control system, extensive ductwork throughout a building is often used to control temperature and humidity of the air within a building. Such duct work is also often used to providing for smoke control, maintaining pressure relationships between spaces, and providing fresh air for occupants. For efficient climate control, electronic duct dampers are often used to shut off air flow to unoccupied or unused rooms, limiting the flow of heated or cooled air to those areas that really need it.

Conventional dampers often are available in two types, normally open dampers and normally closed dampers. Applying power (for example, 24 volts AC at 500 mA) to a normally open damper will cause the damper to close, shutting off all air flow. Conversely, apply power to normally closed dampers causes them to open. A conventional damper often is equipment with a spring, which returns the damper to its original position when power is removed. Dampers are often controlled by a control panel, which sends electrical signals to the damper. Dampers can also be controlled manually by using a switch to apply and remove power to the damper.

Conventional dampers often include valve actuators which are energized for a single direction of rotation and wind up an external spring when they travel in that direction. When power is removed, the external spring back drives the gear train and motor in the opposite direction and returns the valve to the original position. The speeds generated during back driving can often greatly exceed the speeds the motor travels when energized. The inertia that is built up during back drive can damage the gear train after repeated impacts. In water delivery systems using conventional valve actuators, such high speed back drive causes water valves to close quickly, and the sudden interruption in water flow often causes a loud noise commonly known as water hammer. In some conventional actuator motors, a flexible rubber structure has been used as a braking device. In such braking devices, the flexible structure moves radially outward under centrifugal force as the rotational velocity of the motor increases. Such conventional braking devices are often complex and expensive and are often susceptible to reliability problems.

From the above, it is seen that improved techniques for controlling the speed of an actuator motor are desired.

BRIEF SUMMARY OF THE INVENTION

The present invention provides techniques directed generally to air and fluid delivery systems. More particularly, the present invention provides a method and device for an improved motor actuator for controlling dampers or valves used in air or fluid delivery systems. Merely by way of example, the present invention provides techniques for a damper actuator motor including a fan brake which is configured to provide a braking force when the motor actuator is back driven. But it would be recognized that the invention has a much broader range of applicability. For example the invention can be applied to motor actuators used to control valves in various gas or fluid delivery systems. The invention can also be used to reduce water hammer in water delivery systems.

In a specific embodiment, the present invention provides for a damper actuator apparatus that includes a substantially sealed housing unit, and a drive motor configured within the sealed housing unit. As an example, the sealed housing unit can be maintained to prevent environmental entities such as dust particles, moisture, and other forms of contamination from entering into and severely damaging electronic elements within the housing. Although it is not required that the housing is perfectly and completely sealed in some embodiment, the term "sealed" should be construed by ordinary meaning according to one of ordinary skill in the art. The drive motor includes a drive member configured to be rotatable about an axial direction, and the drive member has a first end and a second end, which may be at the outermost portion or slightly within the outer most portion. The damper actuator apparatus also includes a drive device (e.g., electric motor, electric motor and gearing) and a spring device, e.g., coil, elastic member, which can be characterized by a spring constant and displacement or the like. The drive device is coupled to the motor via the drive member, the drive device being configured to be driven in a first direction about the axial direction by the motor, whereas the spring device is coupled to the drive device, the spring device being configured to apply force to the drive device such that the drive device rotates in a return direction opposite (which may be counter rotational) to the first direction. The damper actuator apparatus further includes a fan device coupled to the drive device, the fan device being configured to reduce a velocity of the drive device during a portion of time when the drive device rotates in the return direction opposite of the first direction. In an embodiment, the sealed housing unit is substantially free from dust particles. In other embodiments, the sealed housing unit can be completely sealed. The sealed housing unit can also include a lower housing member coupled to an upper housing member. Alternatively, the housing unit can be a single piece or multiple pieces according to a specific embodiment. In an embodiment, the upper housing member also includes a plurality of baffles to increase air resistance.

In an alternative embodiment, the damper actuator apparatus includes a fan device configured to provide a first braking force when the motor device is rotating in the first direction and a second braking force when the motor device is rotating in a second direction opposite to the first direction. According to an embodiment, the fan device can be a paddle fan. In some embodiments, the fan device can also include a shaft configured to rotate about an axis, a base plate perpendicular to the axis, an upper plate perpendicular to the axis and coupled to the shaft, a cylindrical side plate coupled to the base plate and the upper plate, and a number of fan blades coupled to the base plate and the cylindrical side plate. In some embodiments, the fan blades are configured to generate more air resistance when the fan device rotates in a first direction than when the fan device rotates in a second direction. In specific embodiments, the invention also provides for fan blades that extend from the cylindrical side plate to the outer portion of the base plate, and fan blades whose outer portions are asymmetric relative to the radial direction. In other embodiments, the fan device further includes an enclosure, with the fan blades being contained within a cavity of the enclosure and the fan blades projecting a size that takes up more than half of the space inside the enclosure. In an embodiment, the enclosure also includes a plurality of baffles.

In an alternative specific embodiment, the present invention provides for a valve actuator motor apparatus that includes a housing unit, a drive motor configured within the housing unit, the drive motor including a drive member configured to be rotatable in a first direction about an axis, and a fan device coupled to the drive member, the fan device being configured to reduce a velocity of the motor during a portion of time when the motor rotates in a return direction opposite of the first direction. In an embodiment, the fan device is configured to provide a first braking force when the motor device is rotating in the first direction and a second braking force when the motor device is rotating in a second direction opposite to the first direction. In a specific embodiment, the fan device can be a paddle fan.

In a particular embodiment, the fan device in the valve actuator motor apparatus includes a shaft configured to rotate about an axis, a base plate perpendicular to the axis, an upper plate perpendicular to the axis and coupled to the shaft, a cylindrical side plate coupled to the base plate and upper plate, and a number of fan blades coupled to the base plate and the cylindrical side plate. The fan blades are configured to generate more air resistance when the fan device rotates in a first direction than when the fan device rotates in a second direction. In a specific embodiment, the fan blades extend from the cylindrical side plate to the outer portion of the base plate, and the outer portions of the fan blades are asymmetric relative to the radial direction. In an embodiment, the fan device further includes an enclosure, with the fan blades being contained within a cavity of the enclosure. The invention also includes fan blades that project a size that takes up over half of the space in the cavity. In an embodiment, the enclosure also includes a plurality of baffles.

In some embodiments, the invention provides for an valve actuator motor apparatus that is configured to be plumbed to a damper in an air duct in a heating system, or alternatively, the valve actuator motor apparatus can be configured to be plumbed within a water transport system.

In another specific embodiment, the invention provides for a damper assembly that includes a damper plate having a first position and a second position, the damper plate including a damper shaft, and an actuator apparatus coupled to the damper shaft, the actuator apparatus being configured to drive the damper plate between at least the first position and the second position. In an embodiment, the actuator apparatus includes a fan device, the fan device being configured to reduce the rotating speed of the damper plate when the actuator apparatus drives the damper plate from the second position to the first position. The valve actuator motor device can further include a substantially sealed housing member, a drive motor within the sealed housing member, a drive device coupled to the motor and configured to be driven in a first direction by the motor, and a spring device coupled to the drive device and configured to drive the drive device and the motor in a return direction opposite to the first direction.

In a specific embodiment, the invention provides for a valve assembly including a valve having an open position and a closed position, a valve stem operatively attached to the valve, a drive device configured to engage the valve stem, a valve actuator motor device configured to drive the drive device to the open position, and a spring configured to drive the drive device to the closed position. The invention also provides that the valve actuator motor device can include a fan device configured to limit the speed of the motor when the spring device is driving the valve to the closed position, and the fan device is configured to limit the speed of the motor only after the speed of the motor exceeds a predetermined threshold.

In yet another alternative specific embodiment, the invention includes a method for making a valve actuator motor device that includes providing a housing member, providing a drive motor within the housing member, and providing a drive device coupled to the motor. The method also includes adding a spring device coupled to the drive device, the spring device being configured to drive the drive device and the motor in a return direction after the motor is turned off. The method also includes adding a fan device coupled to the motor; with the fan device configured to reduce the speed of the drive device when the drive device is driven by the spring device in the return direction. In an aspect of the invention, the method also provides a substantially sealed enclosure member adjacent to the housing member in order to allow the fan device to be configured to reside within a cavity of the enclosure member. The method also provides that the fan device is further adapted to project a size that takes up more than half of the space of the cavity. In an embodiment, the enclosure member also includes a plurality of baffles.

Many benefits are achieved by way of the present invention over conventional techniques. For example, the invention provides a method and device to reduce back drive velocity of an actuator motor to prevent damage to the motor and gear train used in control devices in dampers and valves. In addition, the invention also provides techniques that are useful in reducing water hammer in water delivery systems. Depending upon the embodiment, one or more of these benefits may be achieved. These and other benefits and various additional objects, features and advantages of the present invention can be more fully appreciated with reference to the detailed description and accompanying drawings that follow.

DETAILED DESCRIPTION OF THE INVENTION

The present invention provides techniques directed generally to air and fluid delivery systems. More particularly, the present invention provides a method and device for an improved motor actuator for controlling dampers or valves used in air or fluid delivery systems. Merely by way of example, the present invention provides techniques for a damper actuator motor including a fan brake which is configured to provide a braking force when the motor actuator is back driven. But it would be recognized that the invention has a much broader range of applicability. For example, the invention can be applied to motor actuators used to control valves in various gas or fluid delivery systems. The invention can also be used to reduce water hammer in water delivery systems.

According to an embodiment of the present invention, a fan brake device is secured to the motor rotor shaft of an actuator motor such that when the motor is powered on, the force generated by the fan blades is not substantial. Repeated laboratory testing of the invention against spring loads, while varying the input power, confirms that the motor actuator has the same driving torque as the same motor actuator with the fan brake removed. When the motor is back driven in the direction opposite the powered direction, the fan brake device produces a drag, and the resultant air resistance provides a braking force to the motor.

Conventional fans are often designed to move air within cavities that are large compared to the size of the fan. According to an embodiment of the invention, a fan brake is configured to project a size that takes up over half of a fan cavity. These fan blades also gather air radially from all directions and discharge it axially in one direction. According to embodiments of the invention, the fan brake device is configured to provide a braking force to the motor device by producing differential pressure and air resistance in a confined cavity. Various additional objects, features and advantages of the present invention can be more fully appreciated with reference to the detailed description and accompanying drawings that follow.

Figure 1:
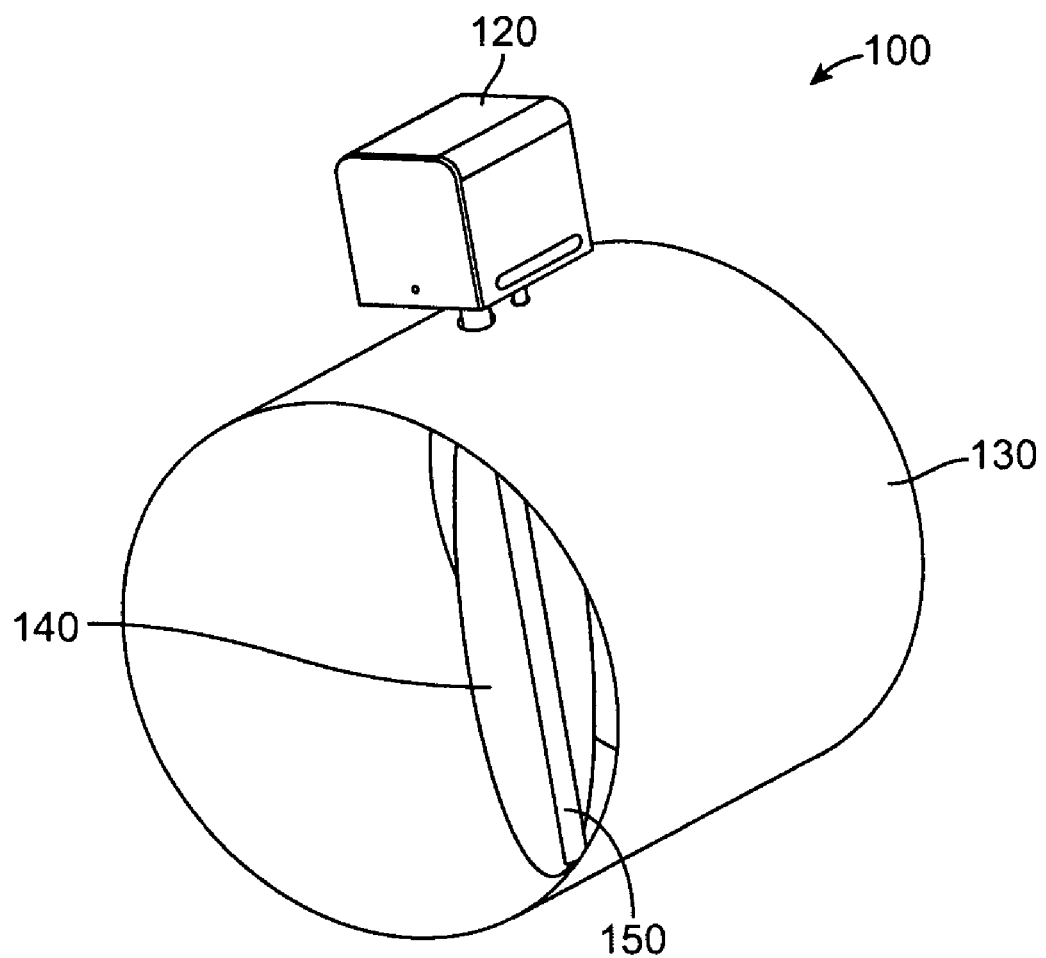
FIG. 1 shows a simplified illustration of a damper apparatus according to an embodiment of the present invention.

As an example, FIG. 1 shows a simplified illustration of an air duct damper apparatus according to an embodiment of the present invention. Damper apparatus 100 includes actuator apparatus 120 enclosed in a sealed housing, air duct 130, and damper plate 140. Damper plate 140 is coupled to a shaft 150 that can be operatively secured to actuator apparatus 120. As will be discussed below, actuator apparatus 120 is configured to actuate damper plate 140 to move between an open and a closed positions in response to command signals from a controller or a manual switch (not shown in FIG. 1). Damper apparatus 100 can be used in duct work in air conditioning systems to regulate air flow and temperature in a building. Actuator apparatus 120 can be used with normally open or normally closed dampers. Further details of actuator apparatus 120 according to an embodiment of the invention is discussed below.

Figure 2:
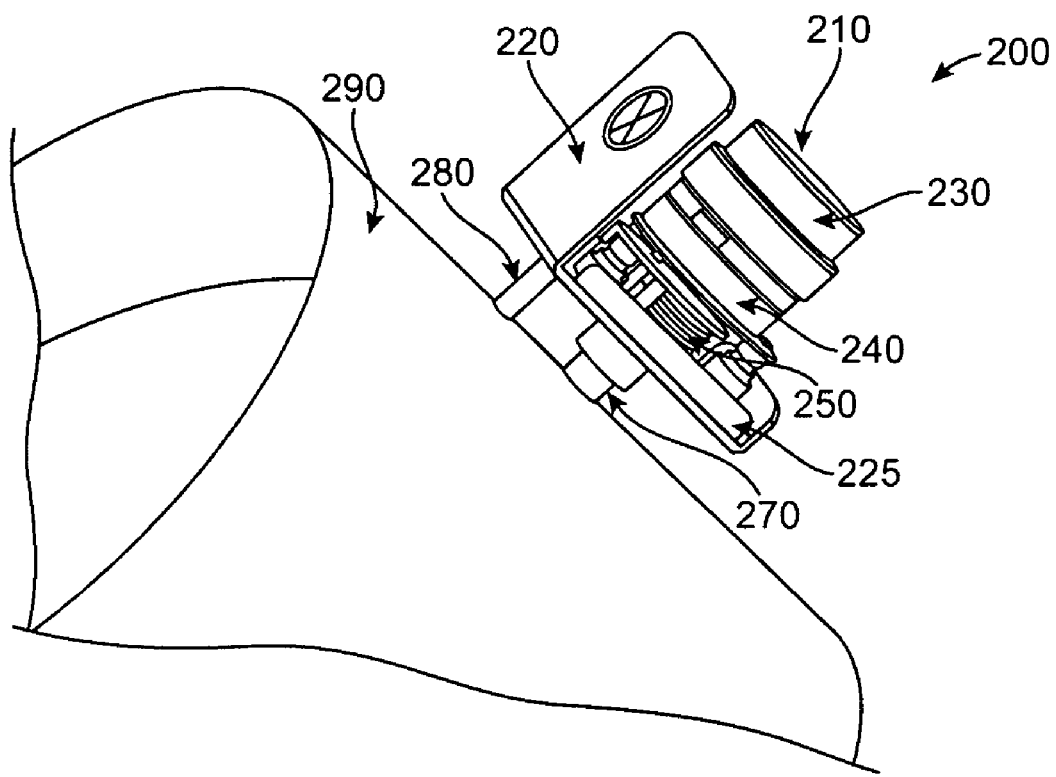
FIG. 2 shows a simplified illustration of a damper apparatus according to an embodiment of the present invention. The housing of the actuator apparatus has been partially removed to show certain details inside the actuator.

For instance, FIG. 2 shows a simplified illustration of an actuator according to an embodiment of the present invention. As shown, actuator apparatus 200 is mounted on air duct 290 by a mounting support 280 and secured to damper shaft 270. As can be seen in FIG. 2, actuator apparatus 200 also includes a side housing panel 220 and a lower housing panel 225, whereas an upper housing panel and other side panels have been removed in order to show the details of the actuator device. Actuator apparatus 200 also includes a release spring device 250, in addition to a motor apparatus 210 enclosed in a cavity formed by upper motor housing 230 and lower motor housing 240. Actuator apparatus 200 may further include a motor shaft and gear train (not shown in FIG. 2) which can be secured to damper shaft 270. Additionally actuator apparatus 200 can further include connectors to power supply and control panels, which are not shown in FIG. 2.

Certain operations of actuator apparatus 200 are now outlined below. Upper motor housing 230 can be energized for a single direction of rotation. As it rotates, motor apparatus 230 winds up release spring device 250. When power is removed, release spring device 250 back drives the gear train and upper motor housing 230 in the opposite direction. According to an embodiment of the present invention, a fan brake device (hidden in the motor apparatus housing in FIG. 2) is secured to the damper shaft 270 through a motor shaft and gear train such that when the motor is powered on, the force generated by the fan blades is negligible. When upper motor housing 230 is back driven by the release spring device 250 in the direction opposite the powered direction, the fan brake device compresses the air within an enclosed fan cavity, causing a drag that slows down the rotating velocity of the motor apparatus.

In FIGS. 1 and 2, motor actuator has been discussed in association with air duct damper applications. It is understood, however, that the examples and embodiments discussed herein are for illustrative purposes only. It will be obvious to a person skilled in the art to use motor actuator to control valves in other fluid delivery systems. For example, motor actuator can be used in a water delivery system to slow down back drive of a valve and reduce water hammer noises. Further details of the present motor actuator device apparatus can be found throughout the present specification and more particularly below.

Figure 3:
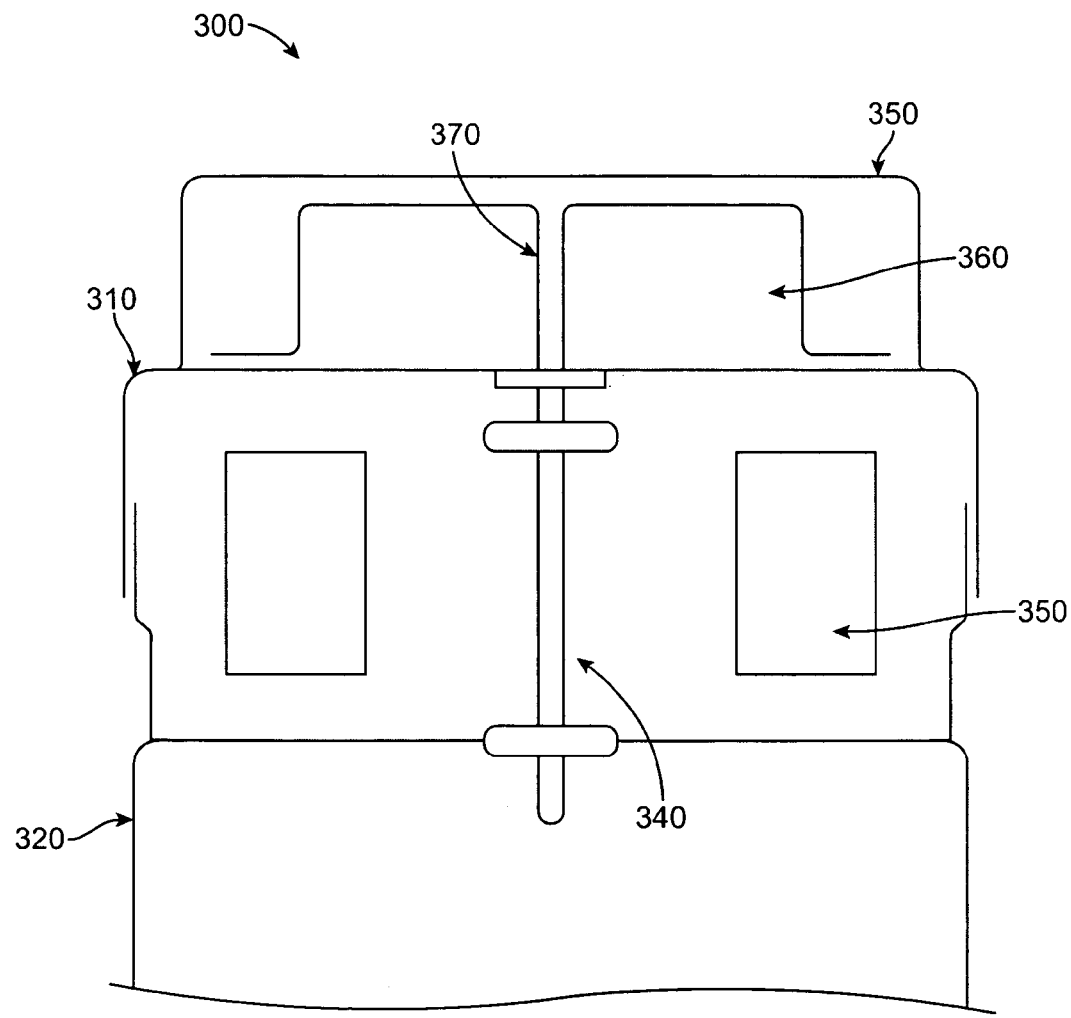
FIG. 3 shows a simplified illustration of a cross-sectional view of a motor device according to an embodiment of the present invention.

FIG. 3 shows a simplified illustration of a cross-sectional view of a motor device according to an embodiment of the present invention. Motor apparatus 300 includes an upper housing member 310 and a lower housing member 320. Coupled together, upper housing member 310 and lower housing member 320 form a substantially sealed enclosure. Such an enclosure can be substantially free of dust particles. In some embodiments, the enclosure forms a completed sealed housing unit. Motor apparatus 300 also includes a motor 330, motor shaft 340, and fan brake apparatus 350. Motor shaft 340 is connected to motor 330 and is configured to be rotatable about an axial direction along motor shaft 340. Motor shaft 340 can also be connected to a drive device, for example, a gear train (not shown in FIG. 3). Motor shaft 340 can be used to drive a damper plate through a gear train, as illustrate previously in FIG. 2. Fan brake apparatus 350 is enclosed in a sealed cavity formed by upper housing member 310 and lower motor housing member 320. Fan apparatus 350 includes a fan 360 mounted to motor shaft 340.

In a damper apparatus according to the present invention, motor apparatus 330 is energized and drives a damper plate via motor shaft 340 and a drive device. As shown previously, when the motor is not energized, a release spring device causes motor shaft 340 to rotate in an opposite direction. Without a brake device, motor apparatus 330 and associated drive device, such as a gear train, can often be driven at higher speeds than the forward speed. The inertia buildup as a result of the high speed can cause damage to the motor apparatus and drive device. To overcome this limitation of conventional damper actuators, a fan brake apparatus 350 is included in motor apparatus 300 according to embodiments of this invention. As shown in FIG. 3, fan break apparatus 350 is coupled to motor shaft 340. Fan break apparatus 350 is configured to reduce velocity of the motor device during a portion of time when the motor device moves in a return direction opposite of the powered direction. When motor apparatus 330 drives motor shaft 340 and fan 360 in the forward direction, fan brake apparatus 350 rotates with motor shaft 340, but does not cause substantial air resistance to slow down motor apparatus 330. Test records verify that Hansen's 12 pole induction motor maintains an average speed of 572 RPM operating a 20 inch damper through ninety degrees of rotation. When motor shaft 340 and the fan brake device 350 are driven in the opposite direction by a release spring (shown previously in FIG. 2), fan 360 draws air towards motor shaft 340 and compresses the air towards upper housing member 310. The compressed air in the cavity causes differential pressure and air resistance, providing a braking force to slow down the rotating velocity of motor shaft 340. Further details of fan brake apparatus 350 can be found throughout the present specification and more particularly below.

Figure 4A:
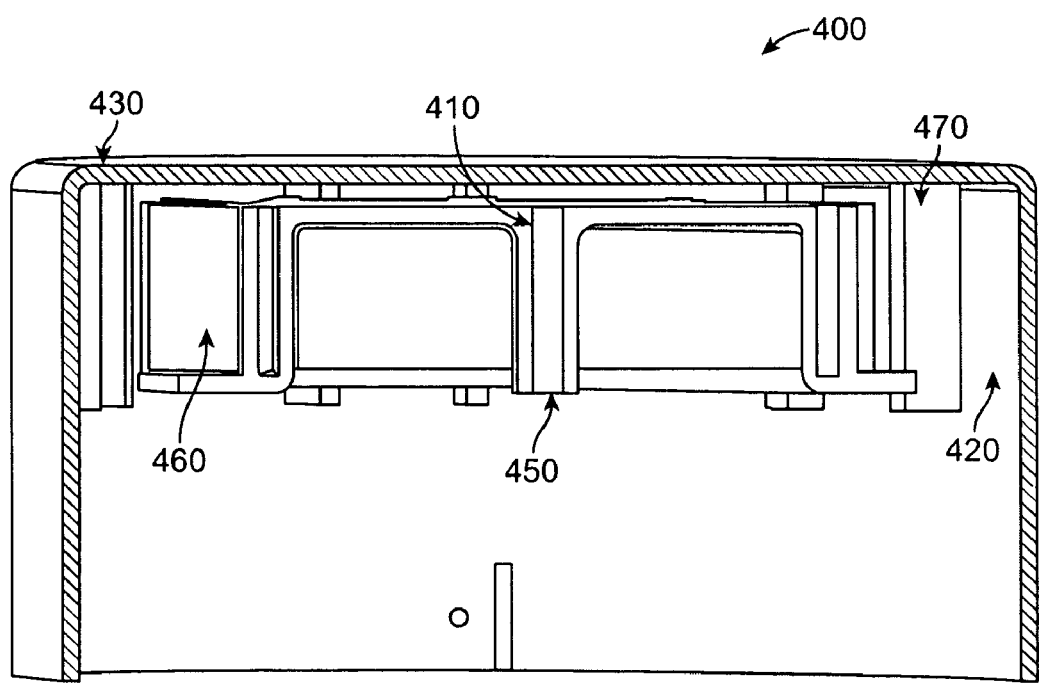
FIG. 4a shows a simplified illustration of a cross-sectional view of a fan brake device in an damper actuator apparatus according to an embodiment of the present invention.
Figure 4B:
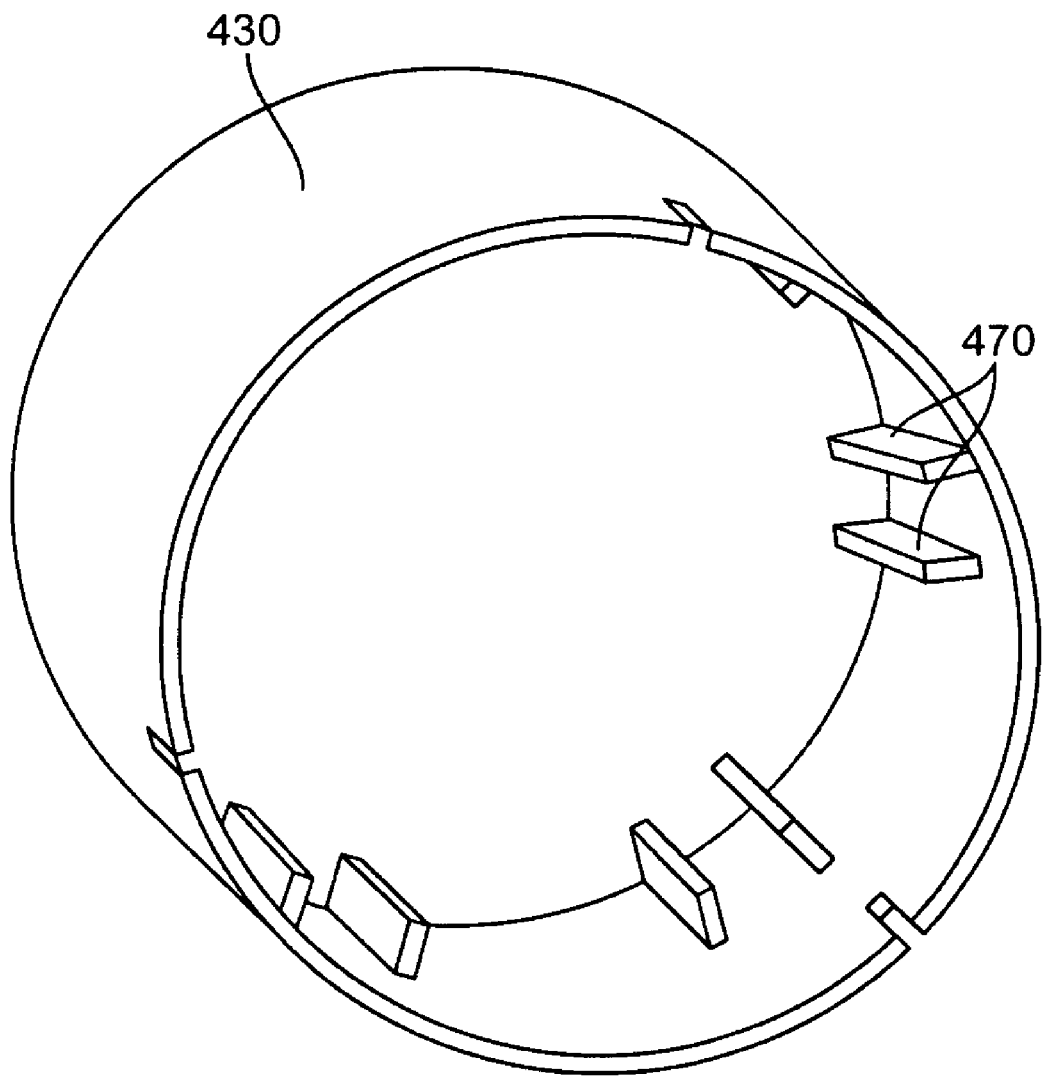
FIG. 4b shows a simplified illustration of an interior view of a housing member according to an embodiment of the present invention.

FIG. 4a shows a simplified illustration of a cross-sectional view of a fan brake device in according to an embodiment of the present invention. As shown, fan brake device 400 includes fan device 410 configured within a sealed cavity 420 enclosed in housing member 430. Fan device 410 further includes fan shaft 450 and a number of fan blades 460. According to an embodiment of the invention, fan device 410 is configured to project a size that takes up over half of the open space in cavity 420. Fan device 410 in one embodiment is configured to gather air radially from all directions and discharge it axially in one direction. In the embodiment depicted in FIG. 4a, the air is discharged axially in the upward direction along fan shaft 450. The action of fan device 410 causes differential pressure and air resistance in the confined space in cavity 420. The air resistance provides a braking force to the motor apparatus. In an embodiment, fan brake device 400 also includes a number of baffles 470 to increase air resistance. For example, FIG. 4b shows a simplified view of the interior of housing member 430 in which baffles 470 attached. In other applications, different shapes and configurations of the baffles can be used. According to embodiments of the invention, fan brake device 400 produces air resistance that increases with higher motor speed, thus providing more effective braking when the motor is rotating at higher speeds. According to an embodiment of the invention, fan blades 460 are configured to gather air from a direction that has a large air gap between adjacent blades and redirects it to a direction with a small air gap, causing drag that increases with motor speed. These and various other features, objects and advantages of the present invention can be more fully appreciated with reference to the detailed description and accompanying drawings that follow.

Figure 5A:
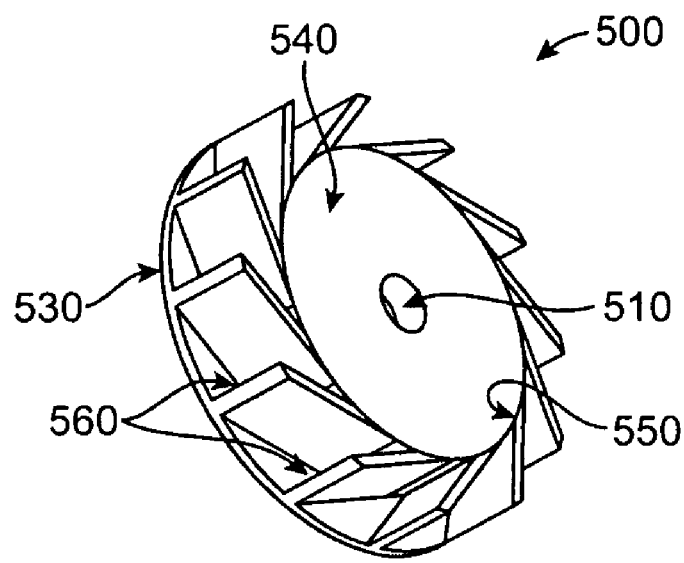
FIGS. 5a, 5b, 5c, 5d, and 5e show; shows simplified illustrations of a fan brake apparatus according to an embodiment of the present invention.
Figure 5B:
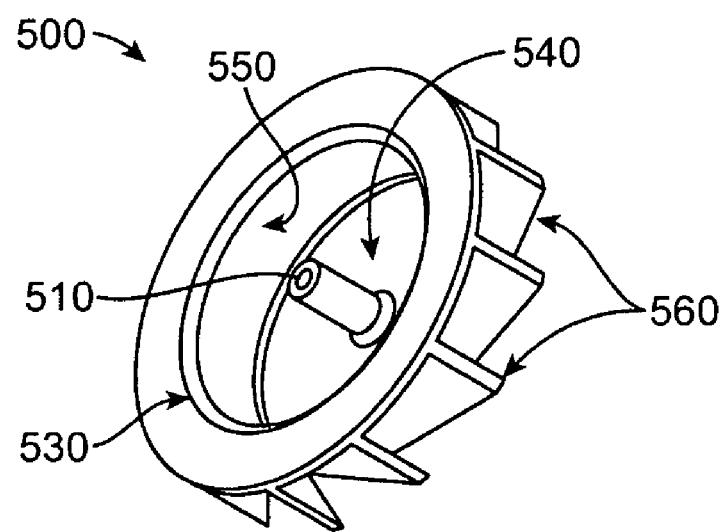
Figure 5C:
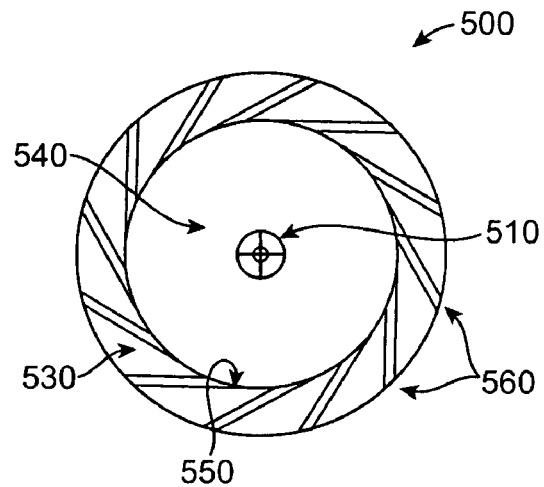
Figures 5D, 5E:
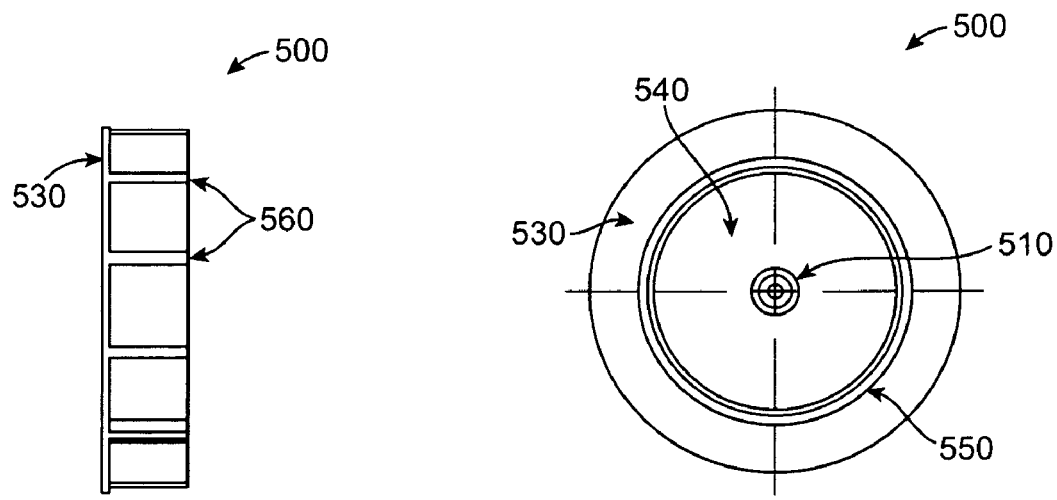

As an example, FIGS. 5a, 5b, 5c, 5d, and 5e show; shows simplified schematic diagrams for a fan device according to an embodiment of this invention. FIG. 5a shows a simplified perspective view of the fan device from above, and FIG. 5b shows a simplified perspective view of the fan from below. FIGS. 5c, 5d, and 5e show illustrations of a top view, side view, and bottom view, respectively, of a fan device according to an embodiment of the present invention.

As shown in FIG. 5a, fan device 500 is configured to rotate about an axis along the direction of axial shaft 510. Fan device 500 also includes a base plate 530 and an upper plate 540, both configured to be perpendicular to shaft 510. As shown in FIG. 5a, upper plate 540 is secured to shaft 510. Fan device 500 also includes a cylindrical side plate 550 coupled to both base plate 530 and upper plate 540. Cylindrical side plate 550 has a radius less than that of base plate 530. Fan device 500 further includes a number of fan blades 560 coupled to both the base plate 530 and cylindrical side plate 550. In one embodiment, blades 560 are configured to extend from the cylindrical side plate 550 to the outer portion of base plate 530 in a direction that is asymmetric relative to the radial direction. Therefore, fan blades 560 are configured to have a preferential direction for gathering air when fan device 500 is rotating about shaft 510. In an embodiment, fan blades 560 are configured such that the gap between two adjacent fan blades at the outer edge of base plate 530 is wider than the gap between those two adjacent blades at the surface of the cylindrical side plate 550, where the blades are coupled to cylindrical side plate 550. Additionally, base plate 530 and side plate 550 are configured to force the compressed air in an axial direction. Such action of fan device 500 produces differential pressure and drag in a confined space in the enclosed cavity as shown in FIG. 4 and previously described. The air resistance thus generated can provide a braking force to the motor apparatus. As will be discussed below, fan device 500 according to embodiments of the invention also produces air resistance that increases with higher motor speed, providing more effective braking at higher motor speed.

Further details of fan device 500 can be seen from FIG. 5b, which shows a simplified perspective view of fan device 500 from below, with parts of the fan device identified with the same numbers as those used in FIG. 5a. As shown in FIG. 5b, fan device 500 is configured to rotate about an axis along the direction of axial shaft 510. Fan device 500 also includes base plate 530 and upper plate 540, both configured to be perpendicular to shaft 510. Fan device 500 also includes a cylindrical side plate 550 coupled to both base plate 530 and upper plate 540. Cylindrical side plate 550 is seen to be coupled to shaft 510 and has a radius less than that of base plate 530. Additionally, fan device 500 further includes a number of fan blades 560 coupled to the base plate 530 and cylindrical side plate 550.

FIGS. 5c, 5d, and 5e provide a top view, a side view, and a bottom view of fan device 500. The components of fan device 500 are designated in these figures by identification numbers consistent with those used in FIGS. 5a and 5b. In a particular embodiment as shown in FIG. 5c, fan device 500 includes 12 fan blades 560, which are straight and extending from the cylindrical side plate 550 to the outer edge of base plate 530. Alternatively, fan blades 560 can be configured to have a curved contour. Additionally, the radii of circular side plate 550 and base plate 530, the number and size of fan blades 560, as well as the height of the circular side plate can also be modified for specific applications.

As discussed above, embodiments according to the present invention provide for motor actuator devices that include a fan brake device to reduce back drive speed of the motor. Such motor actuator devices according to embodiments of the invention can be applied in a variety of fluid delivery systems. For example, the motor apparatus can be used in an air duck damper or used with in an electronic controlled valve device in a water delivery system, such as a sprinkler system. To verify the performance of the fan brake device, we performed experiments using motor devices with and without a fan brake device according to an embodiment of the invention to measure a variety of parameters. First, comparisons were made between a motor device with and without a fan brake device. Then performances of a damper driven by motor actuators with and without a fan brake device was evaluated. In addition, performances of a valve assembly driven by motor actuators with and without a fan brake device were compared.

First, moment of inertia of motor assembly was measured. The paddlewheel fan was injection molded with a glass-fiber reinforced nylon. It has an outside perimeter of 1½ inches in diameter and a total spatial thickness of less than ⅜ of an inch. As shown in Table 1, the fan brake device increased the moment of inertia of the rotor, spindle and hub combination, which constitute the rotating elements of the motor, from 11.86 gm-cm$^2$ to 20.64 gm-cm$^2$. The increased inertia shows no measurable delay in the energized operation of the motor, but does increase the total elapsed time for spring closing in the back-drive mode. Tests with the paddlewheel fan installed upside down show the effect of the inertia by itself and tests with the fan installed right side up show the effect of the inertia and air turbulence.

TABLE 1

| Device | Moment of Inertia |
|---|---|
| rotor, spindle and hub | 11.86 gm-cm$^2$ |
| rotor, spindle, hub & fan brake | 20.64 gm-cm$^2$ |

The braking power of the fan brake device was then tested in two applications, one in an air duct damper application and the other in a valve assembly application. The result of the damper test is shown below in Table 2.

TABLE 2

| Damper configuration | Reset Time (seconds) | speed @ 8% before impact (rad/sec) | Kinetic Energy (N-m-rad$^2$) |
|---|---|---|---|
| No Fan Brake | 4.88 | 503 | .300 |
| With Fan Brake | 7.60 | 324 | .217 |

As can be seen in Table 2, the speed of the motor device at 8% before impact was reduced from 503 radians per second to 324 radians per second with the addition of a fan brake device. Corresponding kinetic energy was reduced from 0.300 to 0.217 Newton-meter-radians$^2$. Reset time, the time the damper takes to close when power is removed, was slowed from 4.88 seconds to 7.60 seconds. It is noted here that the fan brake reduced the rotating speed of the motor device by about 36% (from 503 rad/sec to 324 rad/sec), and reduced the kinetic energy by more than 28% (from 0.300 to 0.217 N-m-rad$^2$).

Similar tests were conducted using a valve is shown in Table 3 below.

TABLE 3

| Valve Configuration | Reset Time (seconds) | speed @ 92% travel (rad/sec) | Kinetic Energy (N-m-rad$^2$) |
|---|---|---|---|
| No Fan Brake | 3.18 | 190 | .043 |
| With Fan Brake | 5.43 | 97 | .018 |

As shown, the speed of the motor device at 92% travel is reduced from 190 radians per second to 97 radians per second with the addition of a fan brake device. Corresponding kinetic energy was reduced from 0.043 to 0.018 Newton-meter-radians$^2$. Reset time was increased from 3.18 seconds to 5.43 seconds. It is noted here that the fan brake reduced the rotating speed of the motor device by about 50% (from 190 to 97 rad/sec), and reduced the kinetic energy more than 50% (from 0.043 to 0.018 N-m-rad$^2$).

It can be seen that the motor actuator apparatus and fan brake apparatus are effective in reducing motor rotational speed. Comparison between data in Table 1 and Table 2 also indicates that the reduction is greater when the rotational speed is higher.

In the examples discussed above, the fan device according to an embodiment of the invention was made of injection molded plastic. The base plate, top plate, and cylindrical side plate, and the fan blades can be integrally formed in metal or plastic. Alternatively they can also be formed independently and then subsequently secured together using suitable techniques such as soldering or welding.

It is also understood that the examples and embodiments described herein are for illustration purposes only. As an example, although the fan is overlying one end of the housing according to a specific embodiment, the fan can be provided on the other end, or provided surrounding the motor housing in other embodiments. Such fan can be "donut" shaped in these embodiments. In other embodiments, there can be more than one fan structure, including two or more fan structures or three or more fan structures. Various modifications or changes in light thereof will be suggested to persons skilled in the art and are to be included within the spirit and purview of this application and the scope of the appended claims.

What is claimed is:

1. A damper actuator apparatus comprising:
   a substantially sealed housing unit comprising a lower housing member and an upper housing member;
   a drive motor configured within the sealed housing unit, the drive motor including a drive member configured to be rotatable about an axis of rotation of the drive motor, the drive member having a first end and a second end;
   a drive device coupled to the motor via the drive member, the drive device being configured to be driven in a first direction about the axial direction by the motor;
   a spring device coupled to the drive device, the spring device being configured to apply force to the drive device such that the drive device rotates in a return direction opposite to the first direction; and
   a fan device coupled to the drive device and disposed in the upper housing member of the housing unit, the fan device comprising a plurality of fan blades radially disposed about the axis of rotation, the fan blades disposed to produce an inflow of air in the radial direction and an outflow of air in the axial direction when the drive device rotates in the return direction opposite of the first direction, wherein the fan device is a paddle fan, wherein the fan blades extend from a cylindrical side plate to the outer portion of a base plate, and wherein the outer portions of fan blades are asymmetric relative to the radial direction,
   the upper housing member comprising a plurality of baffles radially disposed about the axis of rotation and axially aligned with the fan blades of the fan device.

2. The damper actuator apparatus as recited in claim 1, wherein the sealed housing unit is substantially free from dust particles.

3. The damper actuator apparatus as recited in claim 1, wherein the sealed housing unit is completely sealed.

4. The damper actuator apparatus as recited in claim 1, wherein the fan device is configured to reduce kinetic energy of the motor device when the motor device is driven by the spring device in the return direction.

5. The damper actuator apparatus as recited in claim 1, wherein the fan device is configured to reduce kinetic energy of the motor device by about 25% when the motor device is rotating in the return direction.

6. The damper actuator apparatus as recited in claim 1, wherein the fan device is configured to reduce the rotating speed of the motor device by about 35% when the motor device is rotating in the return direction.

7. The damper actuator apparatus as recited in claim 1, wherein the fan device further comprises:
   a shaft configured to rotate about the axis;
   a base plate perpendicular to the axis;
   an upper plate perpendicular to the axis and coupled to the shaft; and
   a cylindrical side plate coupled to the base plate and the upper plate;
   wherein the plurality of fan blades are coupled to the base plate and the cylindrical side plate;

wherein the fan blades are configured to generate more air resistance when the fan device rotates in a first direction than when the fan device rotates in a second direction.

8. The damper actuator apparatus as recited in claim 1, wherein the a fan device further includes an enclosure, a fan blades being contained within a cavity of the enclosure and fan blades projecting a size that takes up more than half of the space of the cavity.

9. The damper actuator apparatus as recited in claim 1, wherein the inflow and outflow of air brake the drive device in the return direction, wherein the fan device does not significantly brake the drive device in the first direction.

10. A valve actuator motor apparatus comprising:
a housing unit comprising a lower housing member and an upper housing member;
a drive motor configured within the housing unit, the drive motor including a drive member configured to be rotatable in a first direction about an axis; and
a fan device coupled to the drive member and disposed in the upper housing member of the housing unit, the fan device comprising a plurality of fan blades radially disposed about the axis of rotation, the fan blades disposed to produce an inflow of air in the radial direction and an outflow of air in the axial direction when the drive motor rotates in a return direction opposite of the first direction, wherein the fan device is configured to provide a first braking force when the drive motor device is rotating in the first direction and a second braking force when the drive motor device is rotating in the second direction opposite to the first direction,
the upper housing member comprising a plurality of baffles radially disposed about the axis of rotation and axially aligned with the fan blades of the fan device.

11. The valve actuator motor apparatus as recited in claim 10, wherein the fan device is a paddle fan.

12. The valve actuator motor apparatus as recited in claim 10, wherein the fan device further comprises:
a shaft configured to rotate about the axis;
a base plate perpendicular to the axis;
an upper plate perpendicular to the axis and coupled to the shaft; and
a cylindrical side plate coupled to the base plate and upper plate;
wherein the plurality of fan blades are coupled to the base plate and the cylindrical side plate;
wherein the fan blades are configured to generate more air resistance when the fan device rotates in a first direction than when the fan device rotates in a second direction.

13. The valve actuator motor apparatus as recited in claim 12, wherein the fan blades extend from the cylindrical side plate to the outer portion of the base plate, and wherein the outer portions of the fan blades are asymmetric relative to the radial direction.

14. The valve actuator motor apparatus as recited in claim 10, wherein the valve actuator motor apparatus is configured to be plumbed to a damper in an air duct in a heating system.

15. The valve actuator motor apparatus as recited in claim 10, wherein the valve actuator motor apparatus is configured to be plumbed within a water transport system.

16. The valve actuator motor apparatus as recited in claim 10, wherein the inflow and outflow of air brake the drive member in the return direction, wherein the fan device does not significantly brake the drive member in the first direction.

17. A damper assembly, comprising:
a damper plate having a first position and a second position, the damper plate including a damper shaft; and
an actuator apparatus coupled to the damper shaft, the actuator apparatus being configured to drive the damper plate between at least the first position and the second position;
wherein the actuator apparatus includes a fan device and comprising a plurality of fan blades radially disposed about the axis of rotation, the fan blades disposed to produce an inflow of air in the radial direction and an outflow of air in the axial direction when the actuator apparatus drives the damper plate from the second position to the first position,
wherein the fan device is a paddle fan,
wherein the fan blades extend from a cylindrical side plate to the outer portion of a base plate, and wherein the outer portions of fan blades are asymmetric relative to the radial direction.

18. The damper assembly as recited in claim 17, wherein the actuator apparatus further comprises:
a housing member;
a drive motor within the housing member;
a drive device coupled to the motor and configured to be driven in a first direction by the motor; and
a spring device coupled to the drive device and configured to drive the drive device and the motor in a return direction opposite to the first direction.

19. The damper assembly as recited in claim 17, wherein the actuator apparatus further comprises a substantially sealed enclosure member adjacent to the housing member, the fan device being contained within a cavity of the enclosure member, and the fan device projecting a size that takes up more than half of the space of the cavity.

20. The damper assembly as recited in claim 17, wherein the inflow and outflow of air brake the actuator apparatus when the actuator apparatus drives the damper plate from the second position to the first position, wherein the fan device does not significantly brake the actuator apparatus when the actuator apparatus drives the damper plate from the first position to the second position.

21. A valve assembly, comprising:
a valve having an open position and a closed position;
a valve stem operatively attached to the valve;
a drive device configured to engage the valve stem;
a valve actuator motor device configured to drive the drive device to the open position; and
a spring configured to drive the drive device to the closed position;
wherein the valve actuator motor device comprises a fan device configured to limit a speed of the motor when the spring device is driving the valve to the closed position, the fan device comprising a plurality of fan blades radially disposed about the axis of rotation, the fan blades disposed to produce an inflow of air in the radial direction and an outflow of air in the axial direction when rotating in a direction that drives the valve to the closed position,
wherein the valve actuator motor device further comprises a substantially sealed enclosure member, the fan device being contained within a cavity of the enclosure member, the cavity of the enclosure having a plurality of baffles radially disposed about the axis of rotation and axially aligned with the fan blades of the fan device,
wherein the speed of the motor is limited by the inflow and outflow of air, wherein the fan device does not significantly limit the speed of the motor when the valve actuator motor device drives the drive device to the open position.

22. The valve assembly as recited in claim 21, wherein the fan device is configured to limit the speed of the motor only after the speed of the motor exceeds a predetermined threshold.

23. The valve assembly as recited in claim 21, the fan device projecting a size that takes up more than half of the space of the cavity.

24. A method for making a valve actuator motor device, comprising:

provide a housing member;

providing a drive motor within the housing member;

providing a drive device coupled to the motor;

adding a spring device coupled to the drive device, the spring device configured to drive the drive device and the motor in a return direction after the motor is turned off;

adding a fan device coupled to the drive motor, the fan device comprising a plurality of fan blades radially disposed about the axis of rotation, the fan blades disposed to produce an inflow of air in the radial direction and an outflow of air in the axial direction when rotating in the return direction;

providing a substantially sealed enclosure member adjacent to the housing member; and configuring the fan device to reside within a cavity of the enclosure member, wherein the cavity of the enclosure includes a plurality of baffles radially disposed about the axis of rotation and axially aligned with the fan blades of the fan device, wherein the inflow and outflow of air brake the drive device in the return direction, wherein the fan device does not significantly brake the drive device in a direction opposite the return direction.

25. The method as recited in claim 24, further comprising adapting the fan device to project a size that takes up more than half of the space of the cavity.

* * * * *